United States Patent
Nakagawa et al.

(10) Patent No.: US 7,398,448 B2
(45) Date of Patent: Jul. 8, 2008

(54) STORAGE SYSTEM HAS THE FUNCTION OF PREVENTING DRIVE WRITE ERROR

(75) Inventors: Yutaka Nakagawa, Yokohama (JP); Ikuya Yagisawa, Tokyo (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 632 days.

(21) Appl. No.: 10/972,435

(22) Filed: Oct. 26, 2004

(65) Prior Publication Data
US 2006/0047872 A1 Mar. 2, 2006

(30) Foreign Application Priority Data
Aug. 31, 2004 (JP) ............... 2004-251605

(51) Int. Cl.
*G11C 29/00* (2006.01)
(52) U.S. Cl. ...................... 714/763; 711/114
(58) Field of Classification Search ........... None
See application file for complete search history.

(56) References Cited

U.S. PATENT DOCUMENTS

| | | | | |
|---|---|---|---|---|
| 5,455,942 A | * | 10/1995 | Mohan et al. | 707/202 |
| 5,477,552 A | * | 12/1995 | Nishiyama | 714/770 |
| 6,988,151 B2 | * | 1/2006 | Tsuruta | 710/36 |
| 2005/0005191 A1 | * | 1/2005 | Judd | 714/5 |

FOREIGN PATENT DOCUMENTS

JP 2001-202295 7/2001

* cited by examiner

*Primary Examiner*—Jacques Louis-Jacques
*Assistant Examiner*—Sam Rizk
(74) *Attorney, Agent, or Firm*—Mattingly, Stanger, Malur & Brundidge PC (57) ABSTRACT

A storage technology for improving reliability in writing host data to a storage device is provided. A first check code based on write data is stored in cache memory 370, and storage section 50 is instructed to write, in specified predetermined storage area, write data with the first check code appended thereto, after which the storage section 50 is instructed to read data stored in said predetermined storage area; a second check code is generated on the basis of the read data, and in the event that the correspondence relationship between the first and second check codes is correct, it is decided that the write data was written normally to the storage section 50.

11 Claims, 12 Drawing Sheets

<CACHE DATA MANAGEMENT TABLE DT>

| DATA ID | WRITE STATUS | CHECK STATUS |
|---|---|---|
| 111111 | 1 (COMPLETED) | 1 (COMPLETED) |
| 222222 | 0 (UNCOMPLETED) | 0 (UNCOMPLETED) |
| 333333 | 1 (COMPLETED) | 0 (UNCOMPLETED) |
| ⋮ | ⋮ | ⋮ |
| xxxxxx | 0 (UNCOMPLETED) | 0 (UNCOMPLETED) |

Fig.6

<CHECK PROCESS MANAGEMENT TABLE CT>

| TARGET | CHECK EXECUTE SETTING |
|---|---|
| LU-1 | 1 (EXECUTE) |
| LU-2 | 0 (DO NOT EXECUTE) |
| LU-3 | 1 (EXECUTE) |
| ⋮ | ⋮ |
| LU-n | 0 (DO NOT EXECUTE) |

STORAGE SYSTEM HAS THE FUNCTION OF PREVENTING DRIVE WRITE ERROR

CROSS-REFERENCES TO RELATED APPLICATION

This application relates to and claims priority from Japanese Patent Application No. P2004-251605, filed on Aug. 31, 2004, the entire disclosure of which is incorporated herein by reference.

BACKGROUND

The present invention relates to a storage technology for saving host data handled by a host computer, using a storage device able to store data.

One storage technology used in the past when writing host data to a storage device involves appending a check code to the host data being written to the storage device, and when transferring to the host computer host data stored in the storage device, using the check code appended to the host data read from the computer to check the host data for errors. According to this conventional storage technology, even if an error should occur in host data saved in a storage device due to electrical noise, physical damage or the like occurring in the storage device, the host computer will be prevented from handling the host data containing the error. Examples of checking using a check code include such error checking methods as longitudinal redundancy check (hereinafter LRC) and cyclic redundancy check (hereinafter CRC).

For example, Japanese Patent Laid-Open Gazette No. 2001-202295 discloses a storage technology in which an error check is carried out using a check code when transferring to a host computer host data stored in a storage device.

SUMMARY

However, with the conventional storage technology, while it is possible, using a check code, to detect errors in host data occurring after writing thereof to a storage device, in the event that an error was such that consistency was maintained between the host data and the check code, it was not possible to detect the error. For example, in the event that when host data is being written to a storage device the host data is not written to the correct storage area of the storage device, older data will continue to be stored in the storage area where the newer data was to have been written, and consistency between this older data and the check code appended thereto will have been error. Thus, an error check of the older data when being transferred to the host computer will lead to the determination that the data is normal.

Possible examples of instances in which host data might not be written in the correct storage area include instances in which host data is written to the wrong storage area (where the storage device is a hard disk, due to "off-track"), or where the host data cannot be written to the storage device at all (where the storage device is a hard disk, due to a temporary disconnect of the disk head circuit).

With the foregoing in view, it is needed to provide a storage technology affording improved reliability during writing of host data to a storage device.

To address the problems discussed above, the first storage system of one embodiment is a storage system for saving host data handled by a host computer, using a storage device having a plurality of storage areas capable of storing data, said storage system comprising: a write data receiving unit that receives host data instructed to be saved from said host computer as write data; a check code appending unit that generates a first check code having a relationship with said write data, and appends said first check code to said write data; a cache memory that stores said first check code; a write instructing unit that instructs said storage device on a write operation for writing said write data having said first check code, to a specified storage area among said plurality of storage areas; a read instructing unit that, after said write operation, instructs said storage device to read data stored in said specified storage area as read data; a check code generating unit that generates a second check code having a relationship with said read data; and a writing check unit that checks a correspondence between said first check code stored in said cache memory and said generated second check code in order to determine whether said write operation has been done normally.

According to the first storage system of the embodiment, it is possible, when writing write data to a storage device, to determine if write data has not been written to the correct storage area of the storage device, and to take appropriate countermeasures. As a result, reliability can be improved in terms of writing host data to a storage device. Since writing of write data is checked by means of comparing check codes, which contain less data than write data, rather than the write data per se, the amount of data needing to be transferred within the storage system can be held down, and checking process speed improved.

To address the problems discussed above, the second storage system of another embodiment is a storage system for saving host data handled by a host computer, using a storage device having a plurality of storage areas capable of storing data, said storage system comprising: a write data receiving unit that receives host data instructed to be saved from said host computer as write data; a check code appending unit that generates a first check code having a relationship with said write data, and appends said first check code to said write data; a cache memory that stores said first check code; write instructing unit that instructs said storage device on a write operation for writing said write data having said first check code, to a specified storage area among said plurality of storage areas; a read instructing unit that, after said write operation, instructs said storage device to read data stored in said specified storage area as read data; a check code extracting unit that extracts a check code from said read data as a second check code; and a writing check unit that checks a correspondence between said first check code stored in said cache memory and said extracted second check code in order to determine whether said write operation has been done normally.

According to the second storage system of the embodiment, like the first storage system, it is possible to improve reliability in terms of writing host data to a storage device and to improve checking process speed. Additionally, in contrast to the first storage system in which a second check code is generated from read data, the check code appended to the read data is treated as a second check code, thereby reducing the processing load needed for the write data writing check, so as to afford further improvement in checking process speed.

DESCRIPTION OF THE PREFERRED EMBODIMENTS

In order to illustrate more clearly the constitution and working effects of the invention set forth hereinabove, some embodiments of the invention is described below, in the indicated order.

Index
A. Working Example 1
  A-(1) Arrangement of Storage System 10
  A-(2) Operation of Storage System 10
    A-(2-1). Write-back Process
    A-(2-2). Data Writing Process
    A-(2-3). Writing Check Process (Working Example 1)
B. Working Example 2 (Writing Check Process)
C. Working Example 3 (Writing Error Process)
D. Working Example 4 (Writing Error Process)
E. Working Example 5 (Writing Error Process)
F. Other Embodiments

A. WORKING EXAMPLE 1

Figure 1:
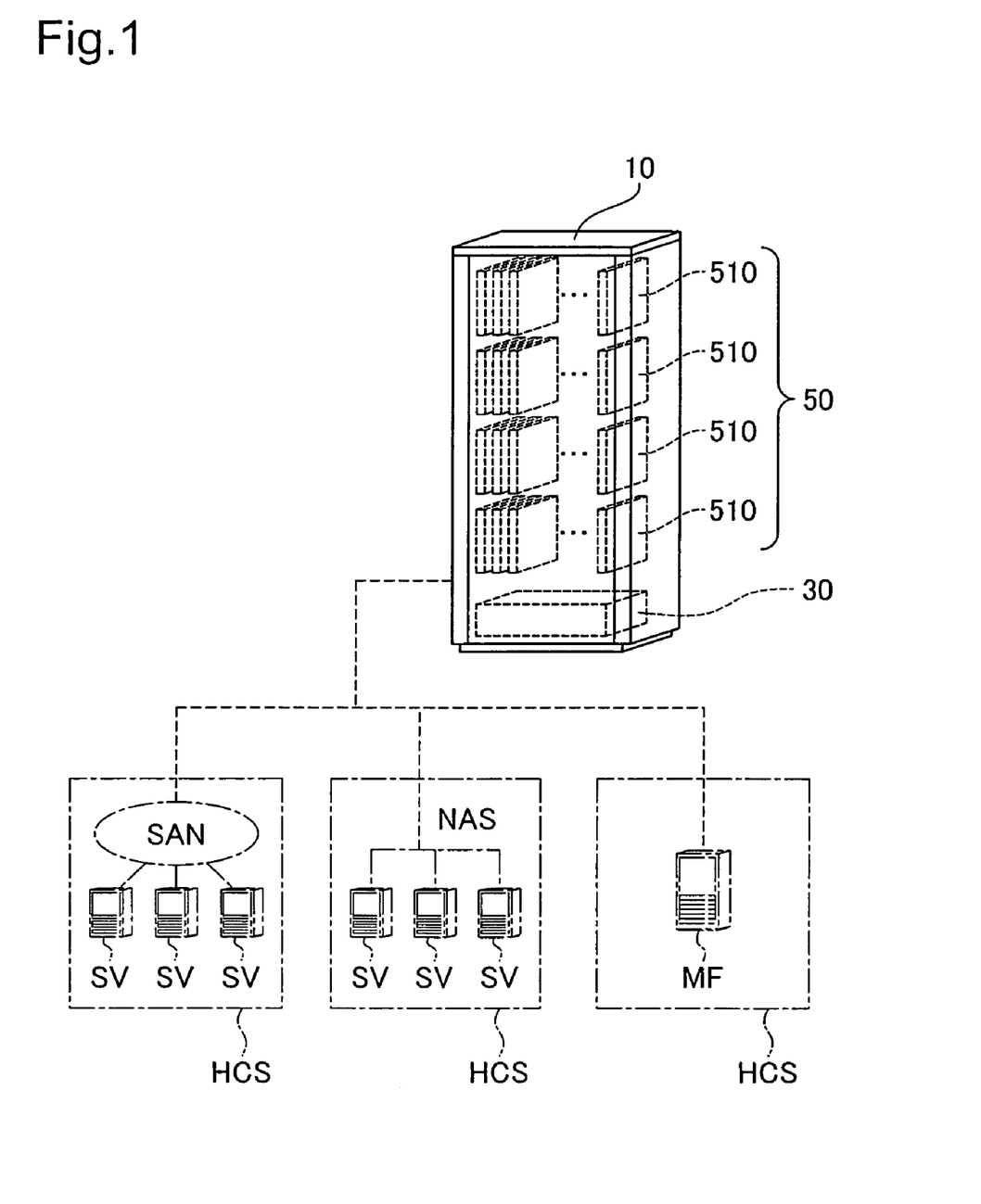
FIG. 1 is an overall perspective view showing the exterior arrangement of storage system 10.

A-(1) Arrangement of Storage System 10:

FIG. 1 is an overall perspective view showing the exterior arrangement of storage system 10. Storage system 10, which is one embodiment of the invention, comprises a storage section 50 composed of a plurality of hard disk drives (HDD) 510 having a plurality of storage areas able to store data; and a RAID controller for controlling storage section 50 by RAID (Redundant Arrays of Independent (Inexpensive) Disks) technology. Storage system 10 is connected to a host computer system HCS, and uses the plurality of HDD 510 to save host data handled by the host computers in the host computer system HCS.

The host computer system HCS may take the form of a system that constitutes a SAN (Storage Area Network) in which servers SV constituting the host computers are connected; a system in which servers SV constituting the host computers are connected to make up a network, using the storage system 10 as NAS (Network Attached Storage), a system composed of a mainframe MF as the host computer, or a system which combines some or all of these systems. The host computer is not limited to a server SV or mainframe MF; various types of computers or personal computers are acceptable as well.

Depending on the form of the host computer system HCS, storage system 10 it is possible to connect with the host computer system HCS via an interface such as Fibre Channel or other SCSI-3 (Small Computer System Interface-3), Gigabit Ethernet (Ethernet is a registered trademark), Mainframe Serial Channel, Mainframe Fibre Channel, or the like.

Figure 2:
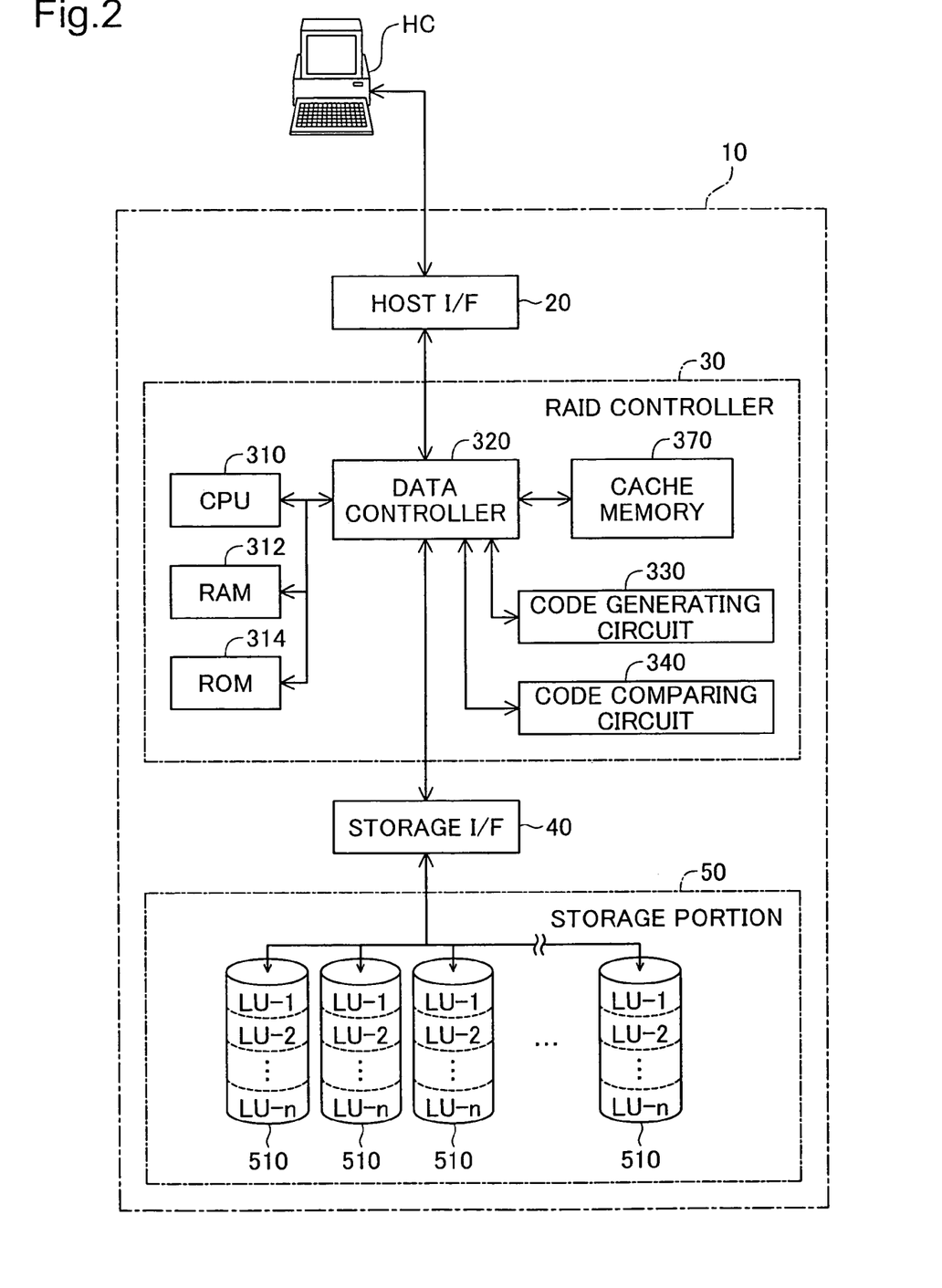
FIG. 2 is a block diagram showing the internal arrangement of storage system 10.

FIG. 2 is a block diagram showing the internal arrangement of storage system 10. The RAID controller 30 of storage system 10 comprises a central processing unit (CPU) 310 for performing operations in order to control the various parts of RAID controller 30; Read Only Memory (ROM) 314 having pre-stored therein a program specifying operations of CPU 310; Random Access Memory (RAM) 312 for temporary storage of data handled by CPU 310; a data controller 320 having a circuit for controlling exchange of host data between the host computer system HCS side and the storage section 50; cache memory 370 for temporary storage of data handled by data controller 320; a code generating circuit 330 for generating, on the basis of said host data, a check code having a predetermined correspondence relationship with host data; and a code comparing circuit 340 for comparing two check codes with one another.

RAID controller 30 carries out various control processes by executing transfer of data among cache memory 370, the code generating circuit 330, and the code comparing circuit 340 by the data controller 320 under control by the CPU 310. RAID controller 30 handles the storage areas of the plurality of HDDs 510 that make up storage section 50 by portioning them into n logical units LU1-LU-n. Logical units LU1-LU-n are further partitioned into logical blocks of storage capacity units able to store data of predetermined data length, each logical block being assigned a logical block address which is a serial number. When RAID controller 30 accesses data on HDDs 510, it specifies a lead logical block address and transfer data length (number of logical blocks), and access the data in a plurality of consecutive logical block units. In this working example, logical blocks are partitioned with storage capacity units able to store 512-byte data, but may instead be partitioned with storage capacity units able to store data of any data length.

In this working example, the check code generated by code generating circuit 330 is an LRC code generated according to the code generating format in LRC, which is one error checking method. In this working example, the code generating circuit 330 generates a 1-byte LRC code on the basis of 512-byte unit data stored in a logical block, but could instead generate an LRC code of any data length, on the basis of data of an arbitrary data length unit.

In addition to the RAID controller 30 and storage section 50, storage system 10 also comprises a host I/F 20 for performing interface conversion between the host computer system HCS and the RAID controller 30; and a storage I/F 40 for performing interface conversion between the RAID controller 30 and storage section 50. The storage I/F 40 and storage section 50 are connected via an IDE (Integrated Drive Electronics), SCSI (Small Computer System Interface), or other interface; in this working example, they are connected via a Fibre Channel.

Figure 3:
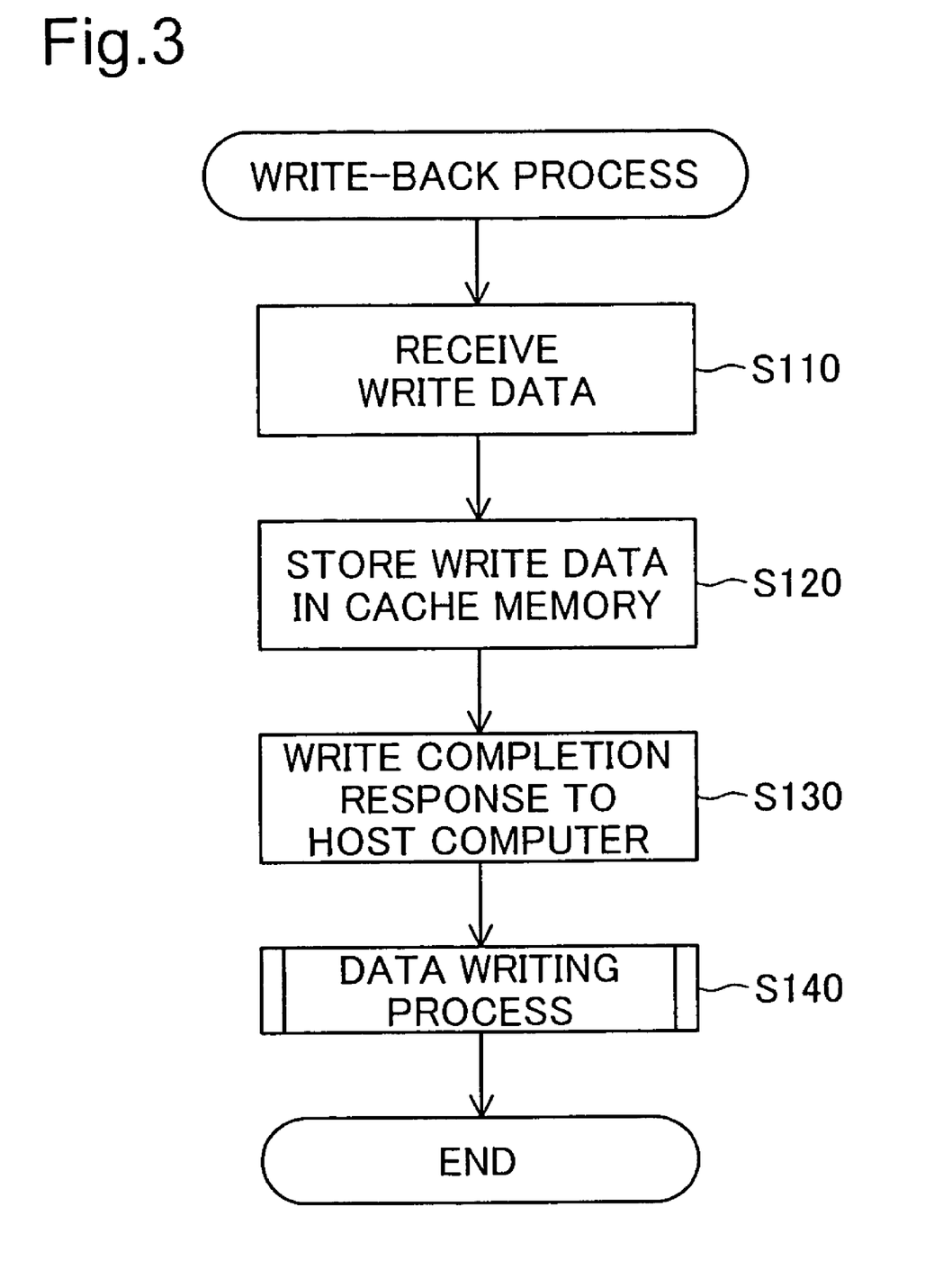
FIG. 3 is a flow chart showing the write-back process of RAID controller 30.

A-(2) Operation of Storage System 10:
  A-(2-1). Write-back Process:

FIG. 3 is a flow chart showing the write-back process of RAID controller 30. The write-back process is a process for writing of host data from a host computer in the host computer system HCS to the storage system 10. When host I/F 20 receives a host data write instruction from host computer system HCS, the RAID controller 30 initiates the write-back process.

When the RAID controller 30 initiates the write-back process, host data—writing of which has been instructed from the host computer system HCS via host I/F 20—is received as write data (Step S110). In this working example, the RAID controller 30 divides the host data—writing of which has been instructed from the host computer system HCS—into 512-byte units, treating each 512-byte unit of host data as one write datum; however, host data of any data length unit could be treated as one write datum. For convenience in the following description, handling of only one write datum is described; in actual practice, however, all of a plurality of write data making up one host datum would be handled in the same manner.

RAID controller 30, after receiving a write datum (Step S110), stores the write datum in cache memory 370 (Step S120). RAID controller 30 then responds to the host computer system HCS regarding completion of writing of the host datum (Step S130). By so doing, the host computer in the host computer system HCS can move to the next process without having to wait for actual completion of writing of host data in storage system 10.

After RAID controller 30 has responded regarding completion of writing of the host datum (Step S130), a data writing process to write the write datum in storage section 50 is executed (Step S140), whereupon the write-back process concludes. Where multiple host data write instructions have been made to storage system 10, RAID controller 30 executes multiple write-back processes in parallel, in response to each of the write instructions.

Figure 4:
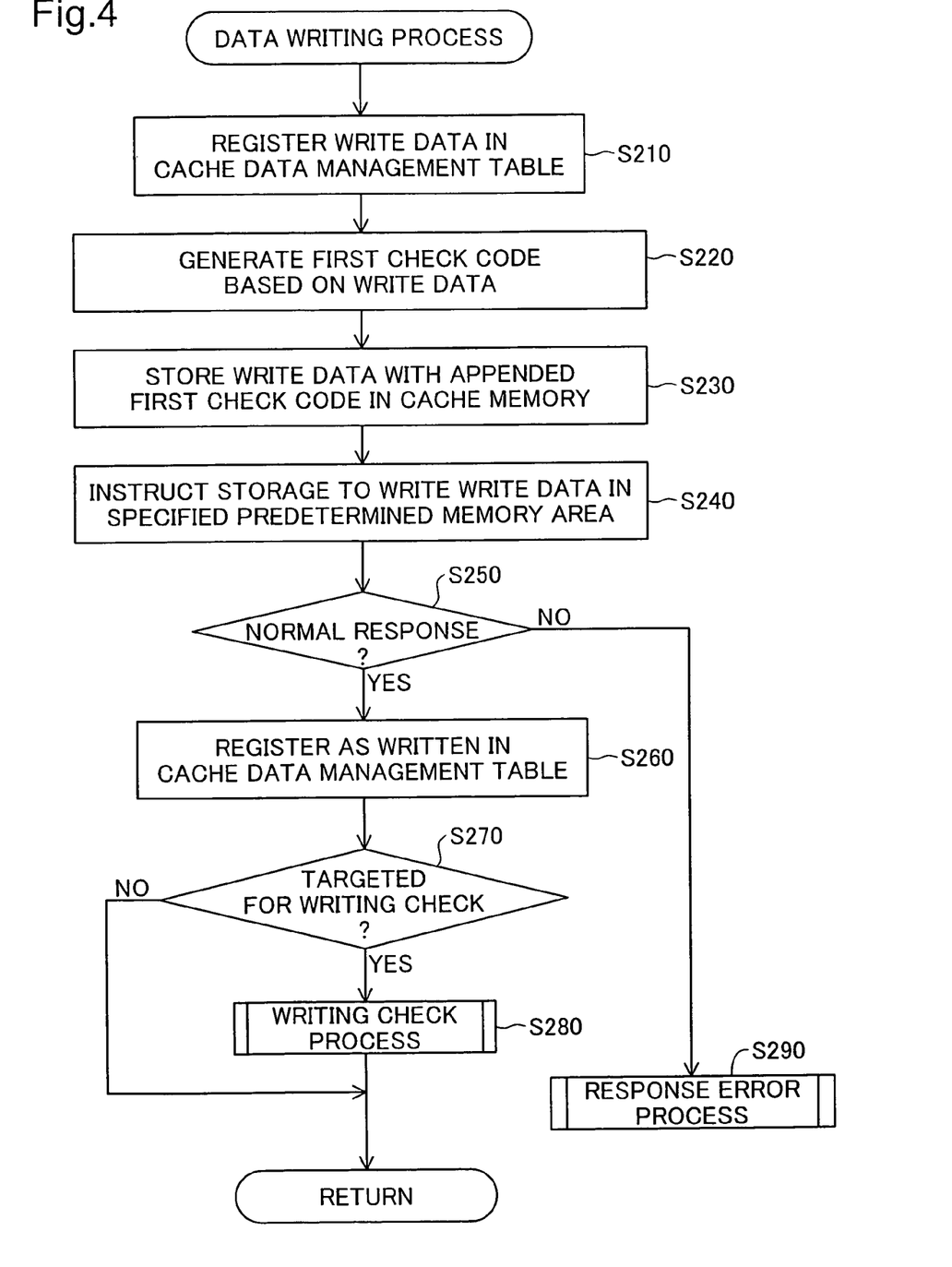
FIG. 4 is a flow chart showing the data writing process of RAID controller 30.

A-(2-2). Data Writing Process:

FIG. 4 is a flow chart showing the data writing process of RAID controller 30. When RAID controller 30 initiates the data writing process, the write datum stored in cache memory 370 (Step S130) is registered in a cache data management table DT, which is a database for managing the progress of processing of the write datum stored in cache memory 370 (Step S210). In this working example, the cache data management table DT is created in RAM 312.

Figure 5:
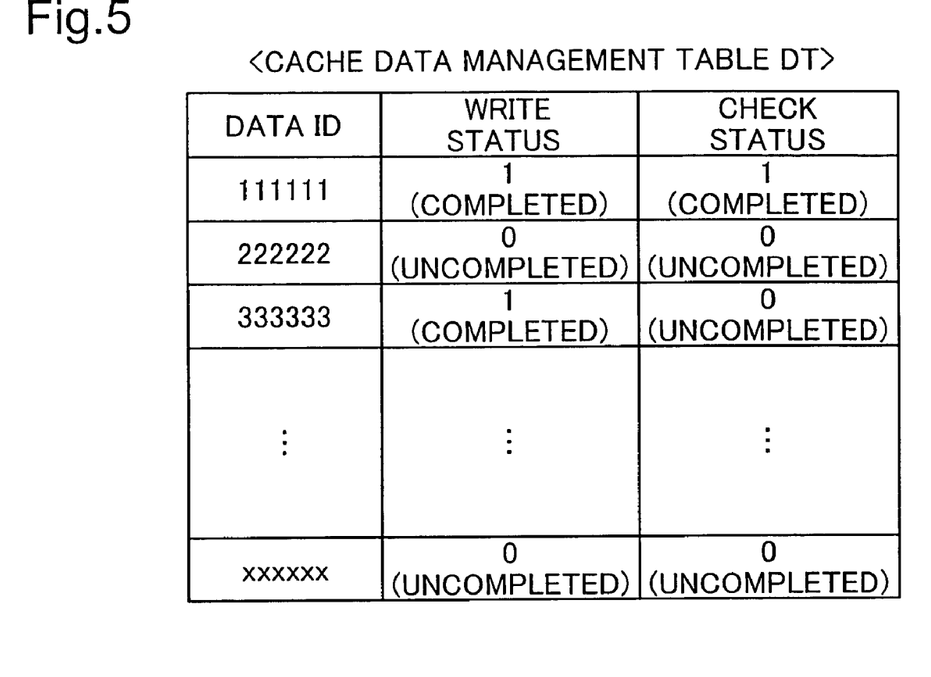
FIG. 5 is an illustration showing an example of a cache data management table DT.

FIG. 5 is an illustration showing an example of cache data management table DT. As shown in FIG. 5, information registered in cache data management table DT includes a data ID enabling identification of each individual write datum, writing status indicating whether the process of writing the write datum in storage section 50 has been completed, and check status indicating whether a writing check process, described later, has been completed for the write datum.

The data ID registered in the cache data management table DT need simply consist of an identifying number enabling identification of each write datum; a combination of logical unit number (LUN) and logical block address, or the address on the cache memory 370, could be used.

For writing status and check status registered in the cache data management table DT, a binary data "0" is registered in the event that the process is not completed, and a binary data "1" is registered in the event that the process is completed. When registering a data ID in the cache data management table DT (Step S210), "0" is recorded for the writing status and check status thereof.

RAID controller 30, after registering the data ID in the cache data management table DT (Step S210), uses the code generating circuit 330 to generate, on the basis of the write datum, an LRC code having a predetermined correspondence relationship with the write datum, by way of a first LRC code (Step S220), and then appends the first LRC code to the write datum and stores it in the cache memory 370 (Step S230).

RAID controller 30 then instructs that the write datum with first LRC code appended be written to storage section 50, in a predetermined storage area designated in the storage section 50 (Step S240). The predetermined storage area to which the write datum is instructed to be written is a storage area determined on the basis of the RAID technology employed by the RAID controller 30. In this working example, one write datum is stored in one logical block, with the storage area in which the write datum is stored being identifiable by the logical block address.

After the RAID controller 30 instructs writing of the write datum (Step S240), if the HDD 510 having the storage area to which writing of the write datum was instructed to be written responds that the write operation completed normally (Step S250), a "1" is registered for writing status in the cache data management table DT shown in FIG. 5, to register completed writing (Step S260).

If on the other hand, there is no response that the write operation completed normally (Step S250), a response error process is executed (Step S290). One possible response error process would be to reset the storage system 10; in this working example, however, the process beginning with writing of the write datum to storage portion 50 (Step S240) is retried.

After RAID controller 30 registers completed writing (Step S260), if writing of the write datum is targeted for checking (Step S270), a writing check process is executed in order to check whether the write datum has been written with no error (Step S280); if writing of the write datum is not targeted for checking (Step S270), the data writing process concludes. The details of the writing check process will be described later.

Figure 6:
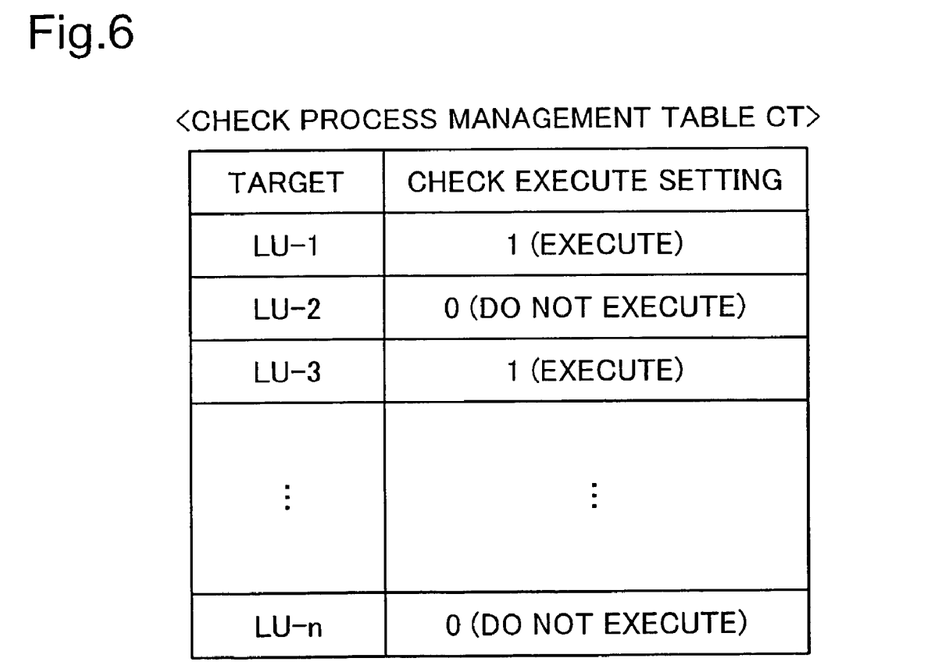
FIG. 6 is an illustration showing an example of a check process management table CT.

FIG. 6 is an illustration showing an example of a check process management table CT. The decision as to whether writing of the write datum is targeted for checking (Step S270) is made in accordance with the check process management table CT. In this working example, check process management table CT consists of default settings pre-stored in ROM 314, which are stored as a RAM 312 check process management table CT at the time of initial setup of storage system 10, with settings of the check process management table CT stored in RAM 312 being modifiable as appropriate from the host computer system HCS, storage system 10 administration computer (not shown) or the like. In this working example, as shown in FIG. 6, on an individual logical unit basis, a binary data "1" is registered if the writing check process is to be executed, and a binary data "0" is registered if the writing check process is not to be executed. RAID controller 30 refers to the check process management table CT, and by deciding whether a logical unit for which a write datum has been written is targeted for a writing check, decides whether writing of the write datum is targeted for checking (Step S270). The decision as to whether writing of a write datum is targeted for checking is not limited to being carried out in logical unit units; there could be employed instead any of various criteria such as RAID group unit, host computer system HCS-connected port unit, host computer system HCS host computer unit, or the like, or writing of all write data could be targeted for checking.

Figure 7:
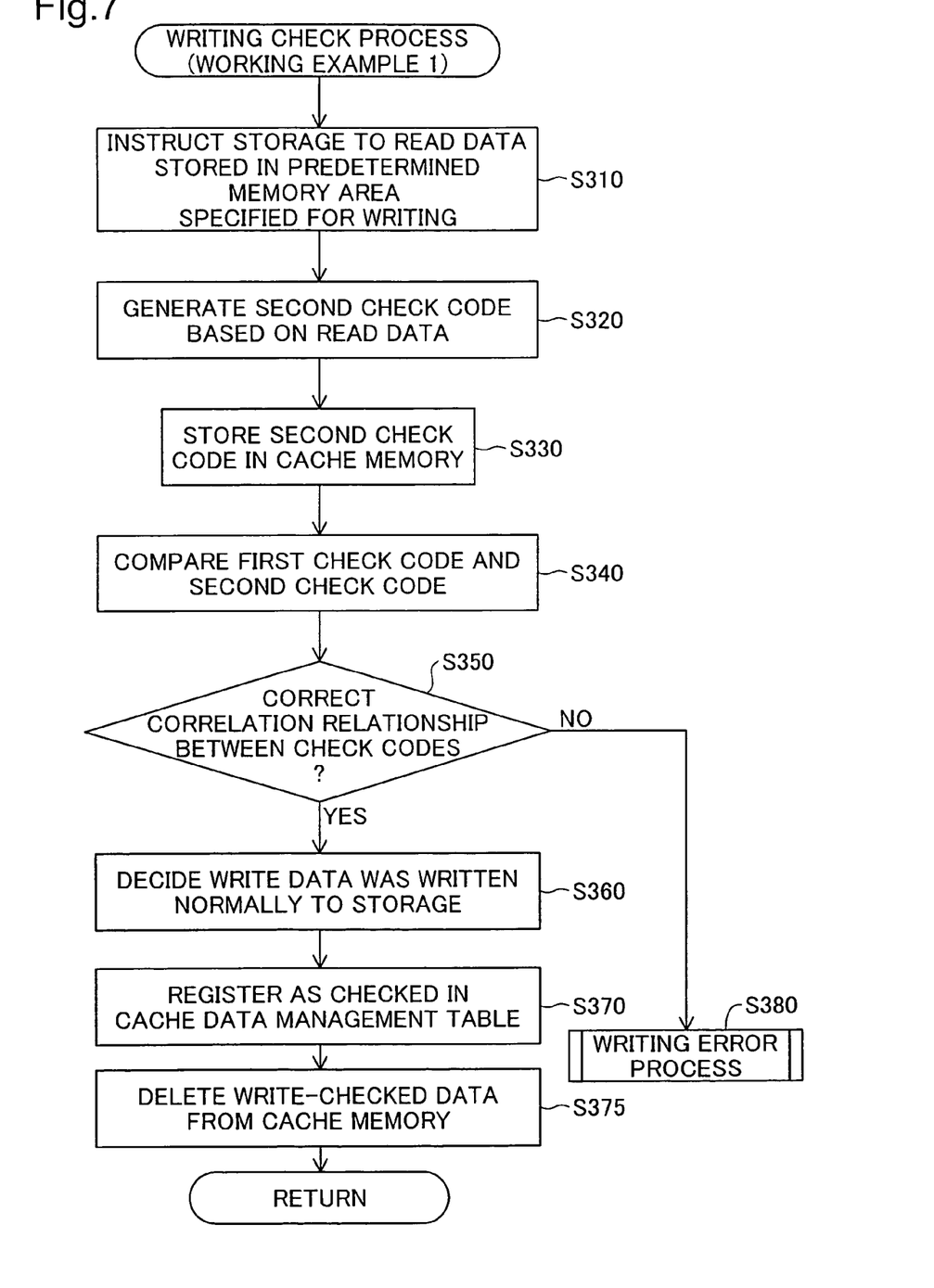
FIG. 7 is a flow chart showing the writing check process of RAID controller 30 in Working Example 1.

A-(2-3). Writing Check Process (Working Example 1):

FIG. 7 is a flow chart showing the writing check process of RAID controller 30 in Working Example 1. When RAID controller 30 initiates the writing check process, the storage portion 50 is instructed to read out, from the designated storage area, data that was written in a predetermined storage area thereof specified for a write operation (Step S240) in the data storage process shown in FIG. 4 (Step S310). Then, by the code generating circuit 330, an LRC code having a predetermined correspondence relationship with the read data is generated on the basis of the read data by way of a second LRC code (Step S320), and the generated second LRC code is stored in the cache memory 370 (Step S330).

Then, the first LRC code and second LRC code stored in the cache memory 370 are compared by the code comparing circuit 340 (Step S340), and a determination is made as to whether the correspondence relationship of the two check codes is correct (Step S350). In this working example, a correct correspondence relationship of the two check codes means that values of the two check codes match.

If the correspondence relationship of the two check codes is correct (Step S350), it is decided that the write datum has been written normally to storage section 50 (Step S360), and a "1" is registered for check status in the cache data management table DT shown in FIG. 5, in order to write completed checking (Step S370). Then, the write datum for which a "1" has been registered for both writing status and check status in the cache data management table DT shown in FIG. 5, as well as the check codes for the datum, are deleted from the cache memory 370 (Step S375), and the writing check process concludes.

If on the other hand, the correspondence relationship of the two check codes is not correct (Step S350), there is executed a writing error process (Step S380), which is a countermeasure employed in instances in which write data is not written normally to storage section 50. In this working example, the writing error process consists of retrying the process beginning with writing of the write datum to storage portion 50 (Step S240 in FIG. 4).

Figure 8:
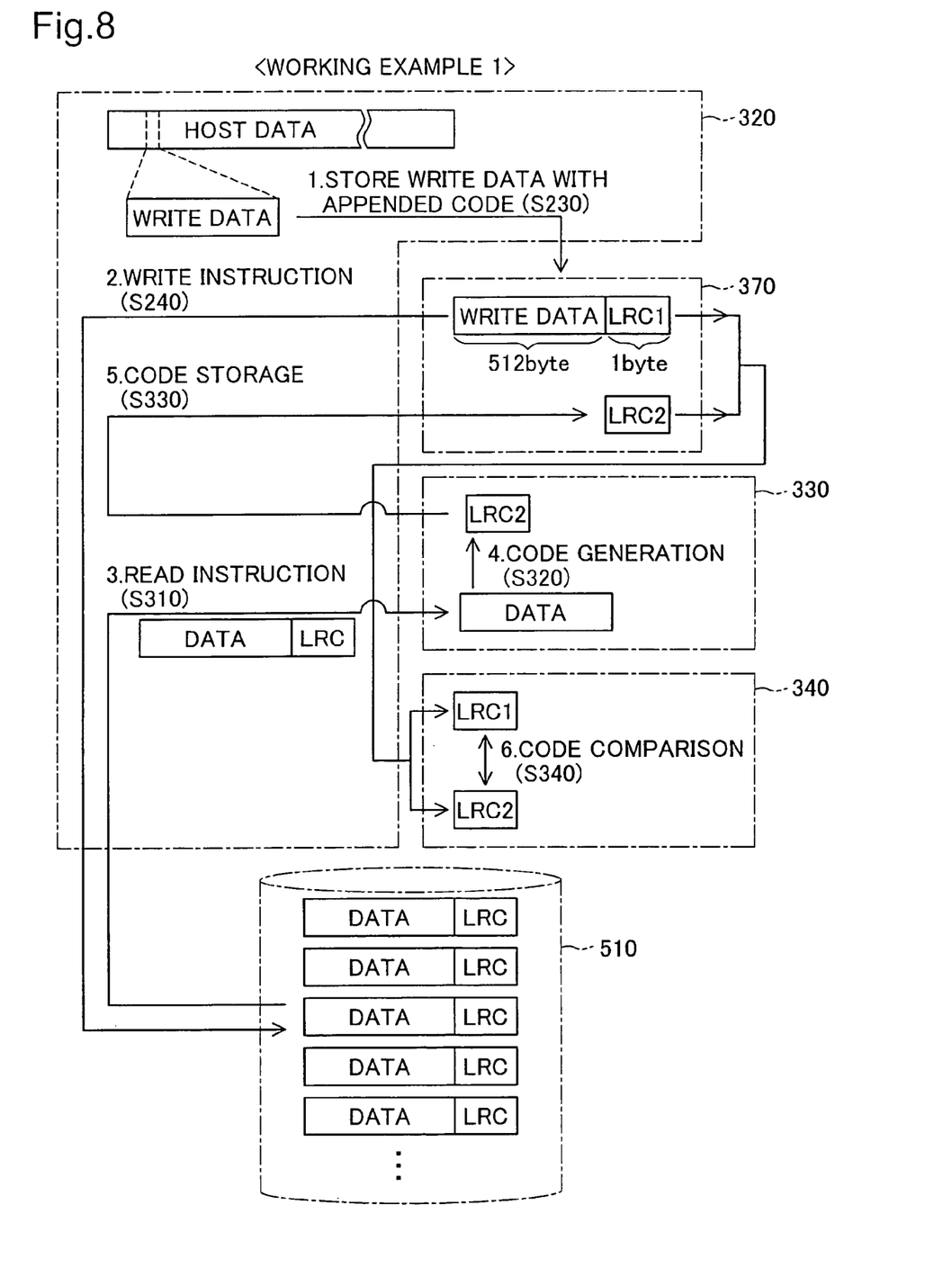
FIG. 8 is an illustration showing data transition in Working Example 1.

FIG. 8 is an illustration showing data transition in Working Example 1. [1] In the write data storage process (Step S230 in FIG. 4) in the data writing process shown in FIG. 4, the write datum with appended first check code LRC1 is stored in cache memory 370 by the data controller 320. [2] In the write instruction process (Step S240 in FIG. 4) in the data writing process shown in FIG. 4, the write datum with appended first check code LRC1, still stored in cache memory 370, is written to HDD 510 via the data controller 320.

[3] In the read instruction process (Step S310 in FIG. 7) of the writing check process shown in FIG. 7, the data with appended check code saved in HDD 510 is read out to the data controller 320, after which the check code is deleted by the data controller 320, and transferred from the data controller 320 to the code generating circuit 330. [4] In the check code generating process (Step S320 in FIG. 7) of the writing check process, a second check code LRC2 is generated by the code generating circuit 330. [5] In the check code storage process (Step S330 in FIG. 7) of the writing check process, the second check code LRC2 is stored in cache memory 370 from the code generating circuit 330 via the data controller 320. [6] In the check code comparing process (Step S340 in FIG. 7) of the writing check process, the check codes LRC1, LRC2 stored in cache memory 370 are transferred to the comparing circuit 340 via the data controller 320.

According to the storage system 10 of Working Example 1 described hereinabove, when writing write data to the storage section 50, it is possible to determine if write data was not written to the correct storage area in storage section 50, and to take appropriate countermeasures. As a result, reliability in terms of writing host data to storage section 50 can be improved. Since writing of write data is checked by comparing LRC codes, which contain less data than the write data, rather than the write data per se, the amount of data needing to be transferred within the storage system 10 can be held down, and checking process speed improved.

Additionally, since the plurality of HDDs 510 making up the storage section 50 are controlled by RAID controller 30 using RAID technology, reliability of saving host data overall can be improved. Also, since the storage section 50 can be instructed to retry writing of write data by the writing error process (Step S380 in FIG. 7), writing of write data that failed to be written can be achieved. Further, since the decision as to whether to execute the writing check process shown in FIG. 7 is made according to the check process management table CT shown in FIG. 6 (Step S270 in FIG. 4), selection of whether to execute the writing check process can be made depending on conditions such as reliability of HDD 510 in storage section 50, writing speed requested from the host computer system HCS, and the like. Additionally, since write data and LRC codes are deleted from cache memory 370 (Step S375 of FIG. 7) after writing has been determined to have taken place normally, the memory capacity required of the cache memory 370 can be held down. Further, since the series of data transitions, generation of check codes, and comparing of check codes shown in FIG. 8 are hardware-executed processes executed respectively by the data controller 320, code generating circuit 330, and code comparing circuit 340, a high speed check process can be achieved.

In the aforementioned data writing process (FIG. 4), writing of host data for which there is a write instruction from the host computer system HCS side was described; however, the data writing process (FIG. 4) could be implemented with parity data based on RAID5 technology, with mirror data based on RAID1 technology, or other redundant data based on RAID technology, to write host data in similar manner. Also, while the aforementioned writing check process (FIG. 7) was described in terms of writing check of host data, the writing check process (FIG. 7) could be implemented with parity data based on RAID5 technology, with mirror data based on RAID1 technology, or other redundant data based on RAID technology, to carry out writing checks of host data in similar manner.

B. WORKING EXAMPLE 2

Writing Check Process

The storage system 10 of Working Example 2, which is another working example of the invention, differs from the constitution and operation of the storage system 10 of Working Example 1 in terms of one operation thereof, namely, the writing check process, but is the same in other respects.

Figure 9:
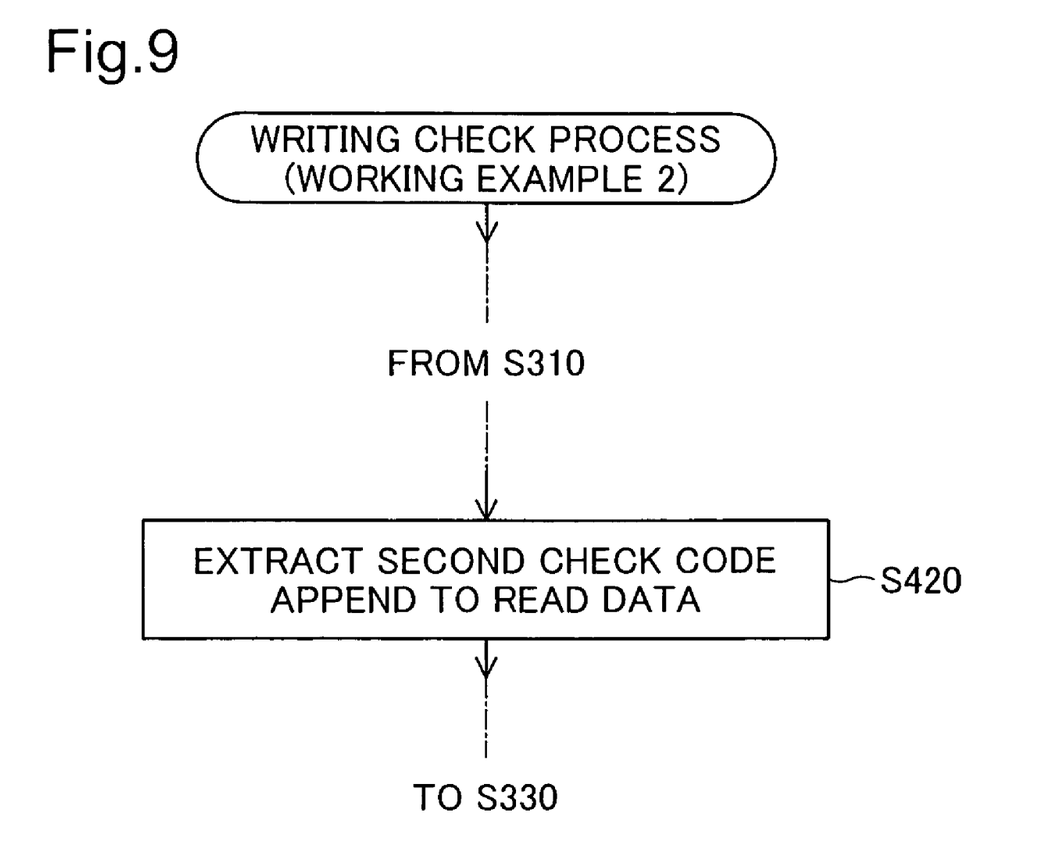
FIG. 9 is a flow chart showing the writing check process of RAID controller 30 in Working Example 2.

FIG. 9 is a flow chart showing the writing check process of RAID controller 30 in Working Example 2. In the writing check process of Working Example 2, rather than generating a second check code on the basis of read data (Step S320 in FIG. 7), as in the writing check process of Working Example 1, instead, the LRC code appended to the read data is extracted as the second LRC code (Step S420); in other respects, the process is the same as the writing check process of Working Example 1.

Figure 10:
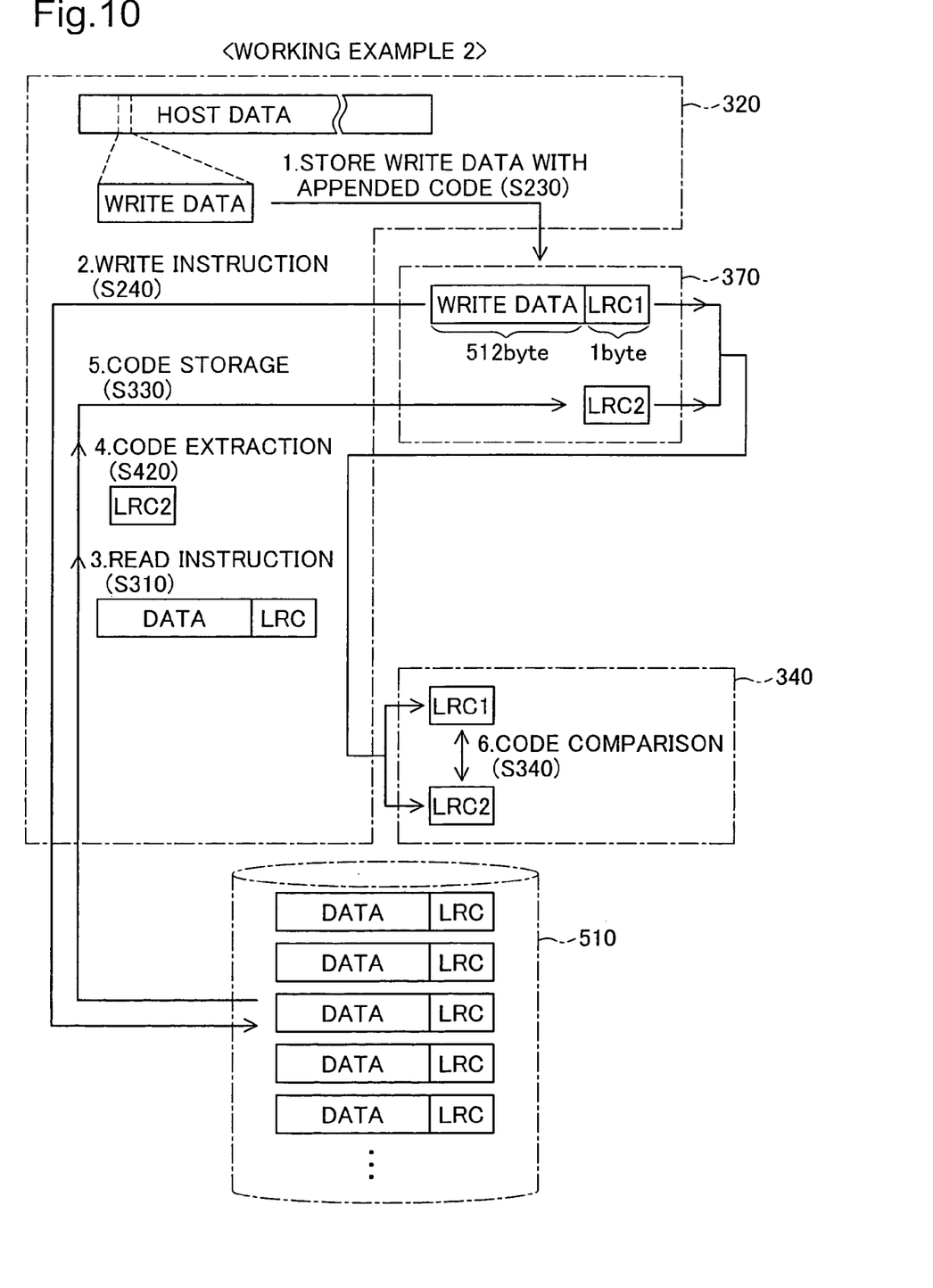
FIG. 10 is an illustration showing data transition in Working Example 2.

FIG. 10 is an illustration showing data transition in Working Example 2. In Working Example 2, after executing [1] a write data storage process and [2] a write instruction process in the same manner as in Working Example 1 shown in FIG. 8, [3] in the read instruction process (Step S310 in FIG. 7) in the writing check process shown in FIG. 7, data with an appended check code saved in HDD 510 is read out to the data controller 320. [4] In the check code generating process (Step S420 in FIG. 8) of the writing check process, the check code appended to the read data is extracted as the second check code LRC2. [5] In the check code storage process (Step S330 in FIG. 7) of the writing check process, the second check code LRC2 is stored to cache memory 370 from the data controller 320. Subsequently, [6] a check code comparing process is carried out in the same manner as in Working Example 1 shown in FIG. 8.

According to the storage system 10 of Working Example 2 described hereinabove, like that of Working Example 1, reliability in terms of writing host data to storage section 50 can be improved, and checking process speed improved. Also, in contrast to Working Example 1 in which the second check code is generated from read data, here, the existing check code appended to the read data is treated as the second check code, thereby reducing the processing load needed for the write data writing check, so as to afford further improvement in checking process speed.

C. WORKING EXAMPLE 3

Writing Error Process

The storage system 10 of Working Example 3, which is another working example of the invention, differs from the constitution and operation of the storage system 10 of Working Example 1 in terms of one operation thereof, namely, the writing error process, but is the same in other respects.

Figure 11:
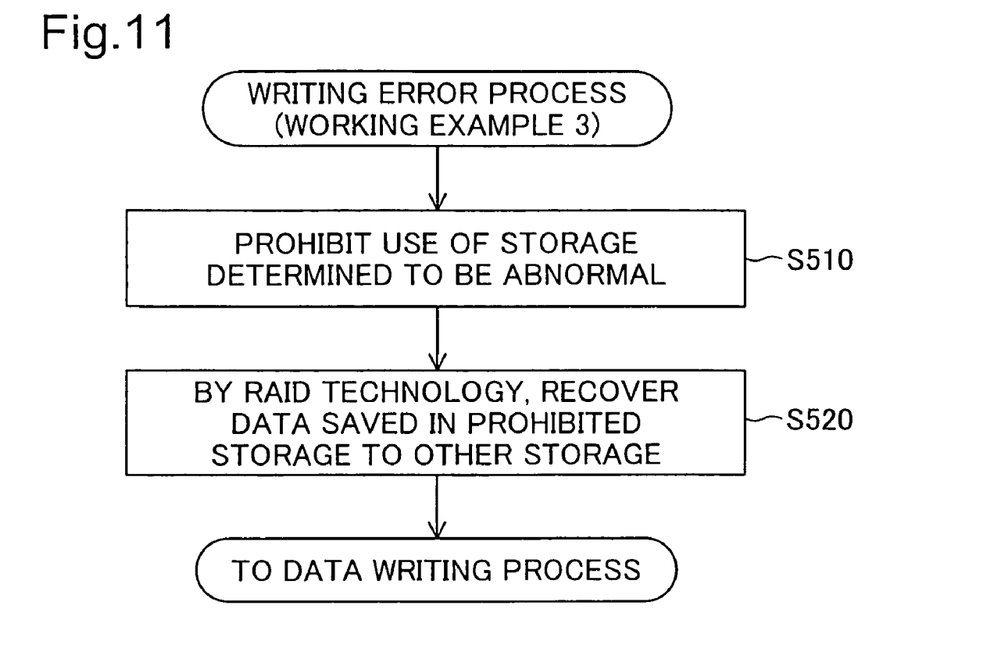
FIG. 11 is a flow chart showing the writing error process of RAID controller 30 in Working Example 3.

FIG. 11 is a flow chart showing the writing error process of RAID controller 30 in Working Example 3. The writing error process of Working Example 3 does not involve immediately retrying writing of write data as in the writing error process of Working Example 1 (Step S380), but rather differs from it in that a recovery process is carried out prior to retrying.

In the writing error process of Working Example 3, RAID controller 30 prohibits any HDD 510 determined to have failed to write data normally in the writing check process (Step S350 in FIG. 7) from being used (Step S510), and using RAID technology recovers onto another HDD 510 the data that was saved on the prohibited HDD 510 (Step S520). It then retries the process beginning with writing of write data to storage section 50 (Step S240 in FIG. 4).

According to the storage system 10 of Working Example 3 described above, by prohibiting use of a less reliable HDD 510 in which a writing error has occurred, it is possible to prevent recurrence of writing errors, as well as to save to another HDD 510 the host data that was saved on the HDD 510. The writing error process of Working Example 3 could also be implemented in the writing error process of Working Example 2.

D. WORKING EXAMPLE 4

Writing Error Process

The storage system 10 of Working Example 4, which is another working example of the invention, differs from the constitution and operation of the storage system 10 of Working Example 1 in terms of one operation thereof, namely, the writing error process, but is the same in other respects.

Figure 12:
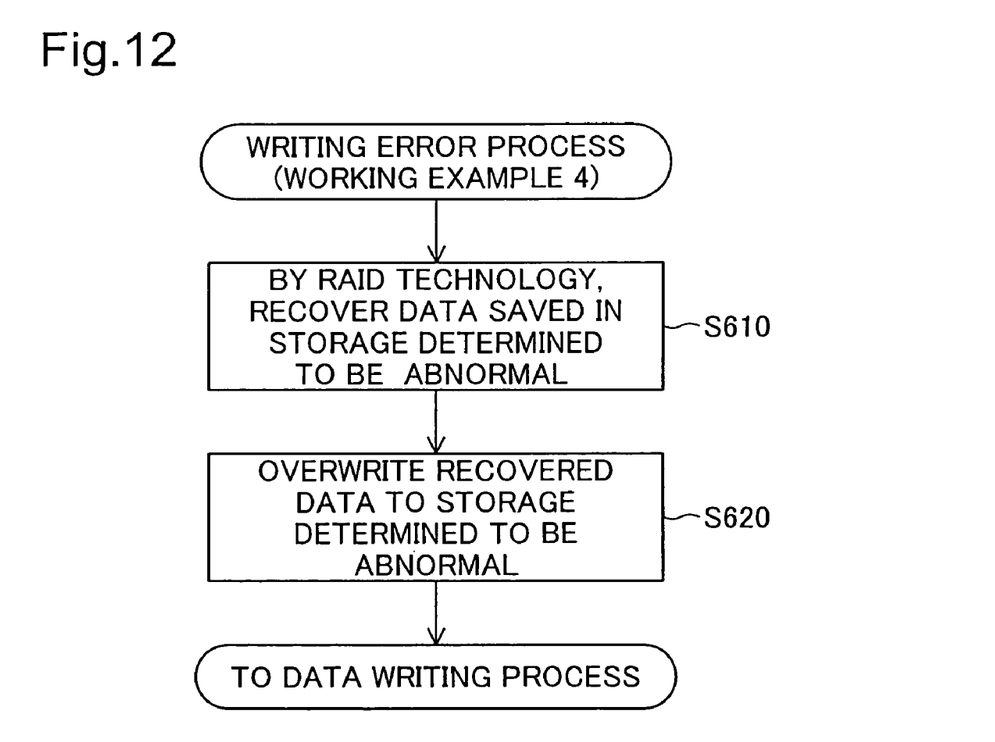
FIG. 12 is a flow chart showing the writing error process of RAID controller 30 in Working Example 4.

FIG. 12 is a flow chart showing the writing error process of RAID controller 30 in Working Example 4. The writing error process of Working Example 4 does not involve immediately retrying writing of write data as in the writing error process of Working Example 1 (Step S380), but rather differs from it in that a recovery process is carried out prior to retrying.

In the writing error process of Working Example 3, RAID controller 30 uses RAID technology to recover data (Step S610) saved on an HDD 510 that has been determined to have failed to write data normally in the writing check process (Step S350 of FIG. 7). The recovered data is overwritten onto the original HDD 510 (Step S620). Then, the process beginnings with writing of write data to storage section 50 (Step S240 in FIG. 4) is retried.

According to the storage system 10 of Working Example 4 described above, even in the event that host data saved in a storage area has been rewritten by write data being written to the wrong storage area, the data saved in the HDD 510 can be recovered. The writing error process of Working Example 4 could also be implemented in the writing error process of Working Example 2.

E. WORKING EXAMPLE 5

Writing Error Process

The storage system 10 of Working Example 5, which is another working example of the invention, differs from the constitution and operation of the storage system 10 of Working Example 1 in that there is appended an address code having a predetermined correspondence relationship to the storage area to which writing of write data is specified, and in terms of the writing error process, but is the same in other respects.

In the data writing process shown in FIG. 4, the RAID controller 30 of Working Example 5 writes write data in a form having an address code appended thereto, in addition to the first LRC code (Steps S220-240 in FIG. 4). In this working example, an address code is appended when dividing host data received from host computer system HCS into 512-byte unit write data, by assigning an initial value address code to the lead write data, and then assigning to subsequent write data address codes obtained by successively incrementing the initial value by 1. The group of write data having address codes appended thereto in this manner is written in order to consecutive logical blocks in storage section 50. While in this working example address codes have 1 byte data length, address codes of any data length could be appended to write data of any data length unit.

Figure 13:
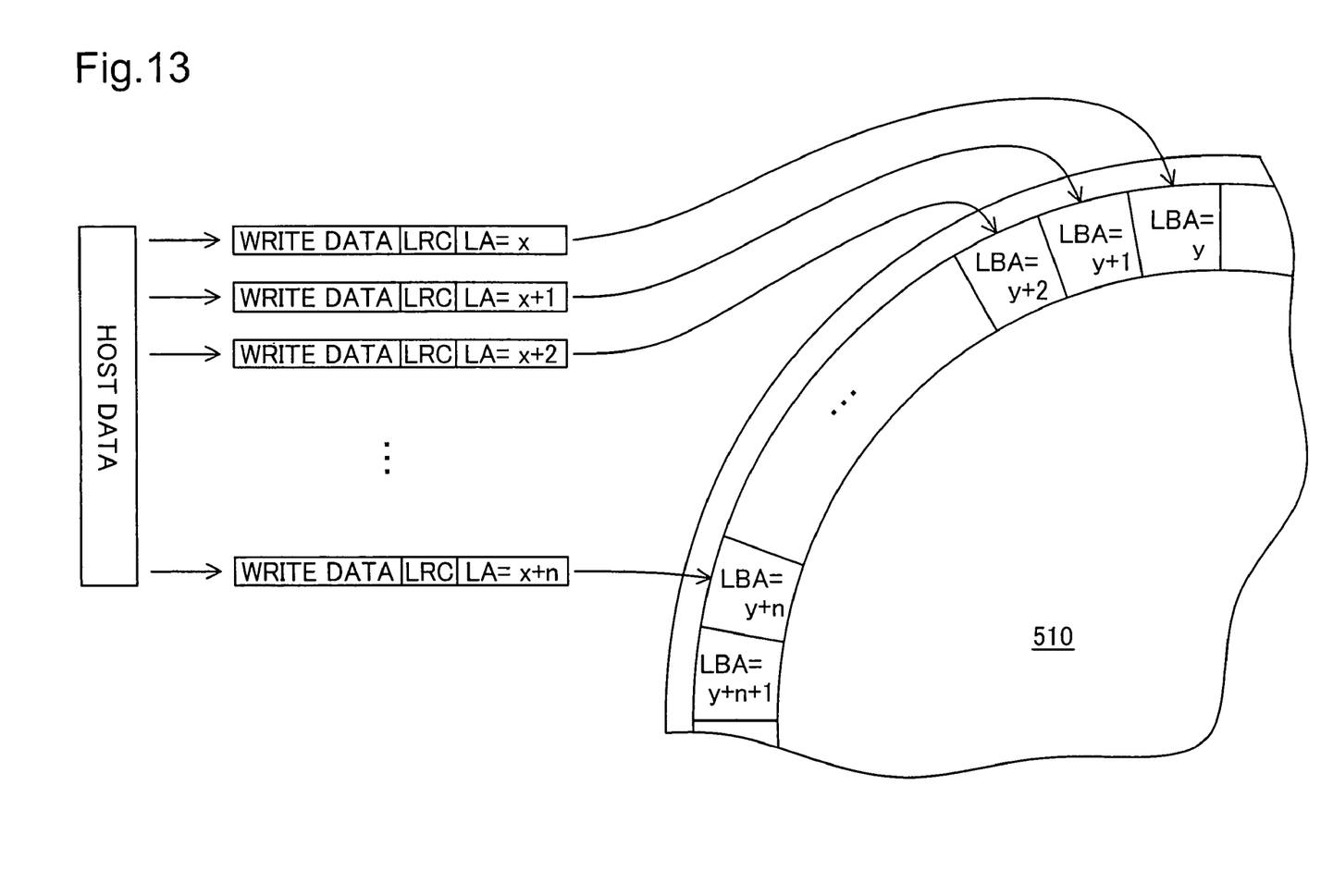
FIG. 13 is an illustration showing in model form relationships between address codes and logical block addresses.

FIG. 13 is an illustration showing in model form relationships between address codes and logical block addresses. To the lead write datum derived by dividing the host data into 512-byte units, an initial value "x" is appended by way of an address code LA; address codes obtained by successively incrementing the initial value "x" by 1 are appended to subsequent write data. An address code LA of "x+n" is appended to the n-th item of write data.

To the logical blocks which are the storage areas of HDD 510 are assigned logical block addresses LBA in the order in which the blocks are lined up. Once the lead write datum is written to the logical block having a logical block address LBA of "y", subsequent write data is written to logical blocks with logical block address LBA values obtained by successively incrementing the initial value "y" by 1. The n-th item of write data is written to the logical block whose logical block address LBA value is "y+n"

By calculating, for a group of data saved on HDD 510, the value "x" of address code LA and the value "y" logical block address LBA in this manner from the continuity of the group of data, it is possible to determine, for a predetermined datum in group of data, whether the correspondence relationship between the address code LA and the logical block address LBA is correct.

Figure 14:
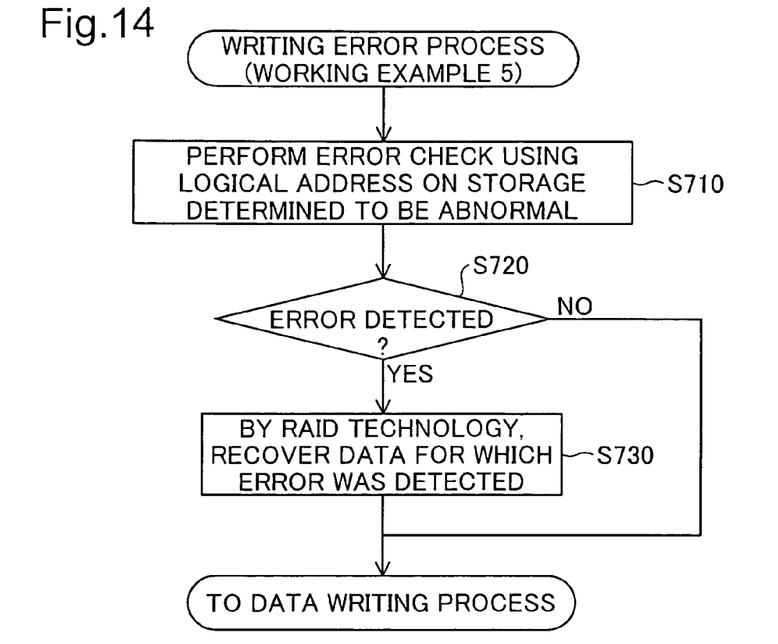
FIG. 14 is a flow chart showing the writing error process of RAID controller 30 in Working Example 5.

FIG. 14 is a flow chart showing the writing error process of RAID controller 30 in Working Example 5. The writing error process of Working Example 5 does not involve immediately retrying writing of write data as in the writing error process of Working Example 1 (Step S380), but rather differs in that a recovery process is carried out prior to retrying.

In the writing error process of Working Example 5, the RAID controller 30 performs error checking using address codes, on an HDD 510 determined in the course of the writing error process (Step S350 of FIG. 7) to have failed to write data normally (Step S710). Error checking using address codes refers to a check in which data in which errors occur in correspondence relationships between address codes and logical block addresses.

If a result of error checking the RAID controller 30 detects an error in the data (Step S720), it uses RAID technology to recover the host data in which the error was detected (Step S720). Subsequently, the process begins with writing of write data to storage section 50 (Step S240 of FIG. 4) is retried.

According to the storage system 10 of Working Example 5 described above, even in the event that host data saved in a storage area has been rewritten by write data being written to the wrong storage area, the host data can be recovered. The writing error process of Working Example 5 could also be implemented in the writing error process of Working Example 2.

F. OTHER EMBODIMENTS

While the invention has been shown and described hereinabove through certain preferred embodiments, the invention is not limited in any way to the particular embodiments herein, and may of course be reduced to practice in various ways without departing from the scope and spirit of the invention. For example, in Working Examples 1 to 5, the invention is implemented in a write-back process (FIG. 3) in which a response is sent to the host computer system HCS prior to completing writing of write data; however, the invention could instead be implemented in a write-through process wherein a response is sent to the host computer system HCS after completing writing of write data.

Figure 15:
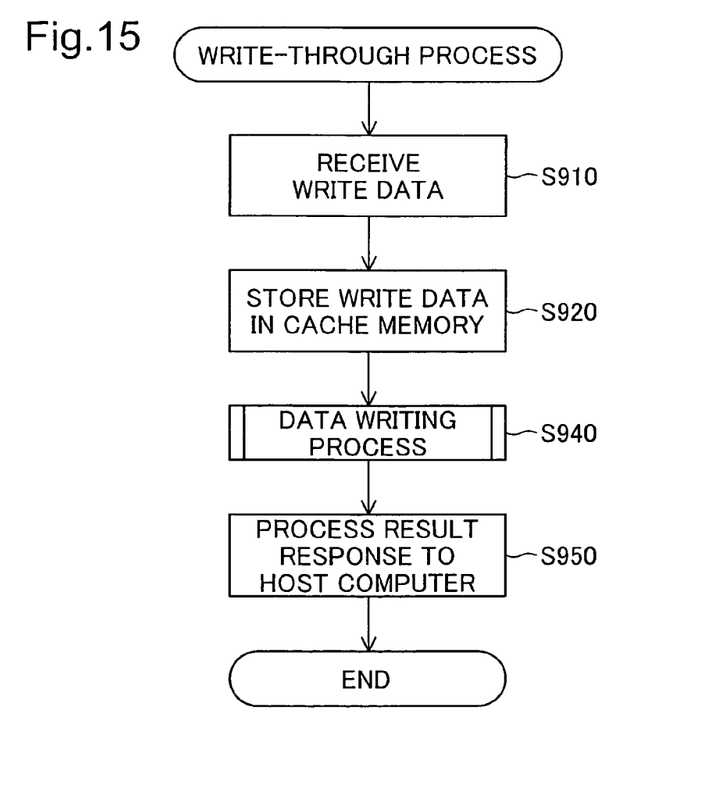
FIG. 15 is a flow chart showing a write-through process of RAID controller 30 in another embodiment.

FIG. 15 is a flow chart showing a write-through process of RAID controller 30 in another embodiment. The write-through process shown in FIG. 15 differs from the write-back process shown in FIG. 3 in that after the data writing process (Step S940), a response is sent to the host computer system HCS (Step S950). In the write-through process, the response to the host computer system HCS need not be writing complete response; by carrying out improper completion response, it may instead be a request to resend a write command.

The first and second check codes used for comparison in the writing check process (FIG. 7, FIG. 9) need not be stored in cache memory, but may instead be stored in a buffer (not shown) within the data controller 320. The storage section 50 is not limited to being composed of a plurality of HDDs 510, but may instead consist of a single HDD 510, or a device, selected from magnetic disks, optical disks, and semiconductor memory, having a plurality of storage areas.

The decision as to whether or not to execute the writing check process (FIG. 7, FIG. 9) need not be made on the basis of a check process management table CT, but could instead be made depending on the type of write command from the host computer system HCS. The cache data management table DT shown in FIG. 5 or the check process management table CT shown in FIG. 6 could be stored in cache memory 370 or in a buffer (not shown) within the data controller 320, rather than in RAM 312.

The check code appended to the write command is not limited to an LRC code, but could instead be a CRC code in a cyclic redundancy check, a serial number assigned in the order in which a write command is received from the host computer system HCS, or such a number having additionally appended thereto the logical address used for access to storage section 50.

In this working example, generation of check codes and comparison of check codes is realized by hardware, i.e. code generating circuit 330 and code comparing circuit 340, but these processes could instead by realized by software.

All changes within the meaning and range of equivalency of the claims are intended to be embraced therein. The scope and sprit of the present invention are indicated by the appended claims, rather than by the foregoing description.

What is claimed is:

1. A storage system for saving host data handled by a host computer, comprising:
a plurality of storage devices having a plurality of storage areas capable of storing data;
a RAID controller that controls said plurality of storage devices by RAID technology,
a write data receiving unit that receives host data instructed to be saved from said host computer as write data;
a check code appending unit that generates a first check code having a relationship with said write data, and appends said first check code to said write data; a cache memory that stores said first check code;
a write instructing unit that instructs said storage device on a write operation for writing said write data having said first check code, to a specified storage area among said plurality of storage areas;
a read instructing unit that, after said write operation, instructs said storage device to read data stored in said specified storage area as read data;
a check code generating unit that generates a second check code having a relationship with said read data;
a writing check unit that checks a correspondence between said first check code stored in said cache memory and said generated second check code in order to determine whether said write operation has been done normally;
a recovering unit that recovers data saved on a storage device for which error is detected by said writing check unit; and
an overwriting unit that overwrites said recovered data onto said storage device for which error is detected.

2. The storage system according to claim 1, wherein said RAID controller comprising: a prohibiting unit that prohibits use of a storage device for which error is detected by said writing check unit; and said recovering unit recovers data saved on said prohibited storage device, by placing said data saved on said prohibited storage device in another storage device different from said prohibited storage device.

3. The storage system according to claim 1, said storage system further comprising: a serial number code appending unit that assigns serial number codes to string said write data, and appends said serial number codes to said string write data; and a serial number check unit that checks a correspondence of a serial number codes of said string write data saved on said storage device in order to determine whether predetermined data of said string write data has been stored in said specified storage area; wherein said RAID controller comprising a recovering unit that performs a check by said serial number check unit on said storage device for which error is detected by said writing check unit, and recovers data stored in a storage area for which error is detected by said serial number check unit.

4. The storage system according to claim 1, said storage system further comprising a rewrite instructing unit that instructs rewriting of said write data to a storage device for which error is detected by said writing check unit.

5. The storage system according to claim 1, said storage system further comprising a check determining unit that determines according to a predetermined criterion whether a decision has been executed by said writing check unit.

6. The storage system according to claim 1, said storage system further comprising a cache deleting unit that, after said writing check unit has determined that normal writing took place, deletes the first check code from said cache memory.

7. The storage system according to claim 1, wherein said storage device has said plurality of storage areas in at least one medium selected from a magnetic disk, an optical disk, and semiconductor memory.

8. The storage system according to claim 1, wherein said relationship in generation of said first and second check codes is a relationship in code generation by longitudinal redundancy checking and/or cyclic redundancy checking.

9. The storage system according to claim 1, wherein said write data is written with, in addition to said first check code, an address code appended thereto, said address code having a relationship with said specified storage area.

10. A data writing method in a storage system that saves host data handled by a host computer, comprising the steps of:
   providing a plurality of storage devices that have a plurality of storage areas, and a RAID controller that controls writing of said host data to said storage devices,
   receiving host data instructed to be saved from said host computer as write data;
   generating a first check code having a relationship with said write data, and appending said first check code to said write data;
   storing said first check code in a cache memory, by said controller;
   instructing said storage device in a write operation to write said write data having said first check code, to a specified storage area among said plurality of storage areas;
   after said write operation, instructing said storage device to read data stored in said specified storage area as read data;
   generating a second check code having a relationship with said read data;
   checking a correspondence between said first check code stored in said cache memory and said generated second check code in order to determine whether said write operation has been done normally;
   recovering data saved on a storage device for which error is detected in said step of checking correspondence; and
   overwriting recovered data onto said storage device for which error is detected.

11. A data writing method in a storage system that saves host data handled by a host computer, comprising the steps of:
   providing a plurality of storage device that have a plurality of storage areas, and a RAID controller that controls writing of said host data to said storage devices,
   receiving host data instructed to be saved from said host computer as write data;
   generating a first check code having a relationship with said write data, and appending said first check code to said write data;
   storing said first check code in a cache memory, by said controller;
   instructing said storage device in a write operation write said write data having said first check code, to a specified storage area among said plurality of storage areas;
   after said write operation, instructing said storage device to read data stored in said specified storage area as read data;
   extracting a check code from said read data as a second check code;
   checking a correspondence between said first check code stored in said cache memory and said extracted second check code in order to determine whether said write operation has been done normally;
   recovering data saved on a storage device for which error is detected in said step of checking correspondence; and
   overwriting recovered data onto said storage device for which error is detected.

* * * * *